United States Patent
Sumi et al.

(10) Patent No.: US 7,891,884 B2
(45) Date of Patent: Feb. 22, 2011

(54) OPTICAL RECEPTACLE AND MANUFACTURING METHOD THEREOF

(75) Inventors: Toshiharu Sumi, Kawaguchi (JP); Shimpei Morioka, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 12/460,645

(22) Filed: Jul. 22, 2009

(65) Prior Publication Data

US 2010/0027944 A1    Feb. 4, 2010

(30) Foreign Application Priority Data

Jul. 30, 2008    (JP) .............................. 2008-196081

(51) Int. Cl.
*G02B 6/36*    (2006.01)

(52) U.S. Cl. ............................... 385/78; 385/79; 385/84

(58) Field of Classification Search ................... 385/78, 385/79, 83, 84, 92
See application file for complete search history.

(56) References Cited

U.S. PATENT DOCUMENTS

| 5,661,834 | A | * | 8/1997 | Watanabe et al. | ............. 385/93 |
| 5,684,903 | A | * | 11/1997 | Kyomasu et al. | ............. 385/93 |
| 6,863,452 | B2 | * | 3/2005 | Takada | ........................ 385/93 |
| 7,156,563 | B2 | * | 1/2007 | Morioka | ....................... 385/93 |
| 2002/0114593 | A1 | * | 8/2002 | Terada et al. | .................. 385/93 |

FOREIGN PATENT DOCUMENTS

JP    2006-184338    7/2006

* cited by examiner

*Primary Examiner*—Daniel Petkovsek
(74) *Attorney, Agent, or Firm*—DLA Piper LLP (US)

(57) ABSTRACT

An optical receptacle including a cylindrical sleeve formed using a material having higher elasticity than that of the optical receptacle main body. The sleeve is held within the sleeve holding section by being press-fitted and a sum of a press-fitted sleeve thickness and a press-fitted holding sleeve thickness in a radial direction is a predetermined value.

4 Claims, 7 Drawing Sheets

OPTICAL RECEPTACLE AND MANUFACTURING METHOD THEREOF

BACKGROUND OF THE INVENTION

1. Field of the Invention

The present invention relates to an optical receptacle and a manufacturing method thereof. In particular, the present invention relates to an optical receptacle suitable for performing optical communication using optical fiber, and a manufacturing method thereof.

2. Description of the Related Art

Since the past, an optical module component referred to as an optical receptacle has been used in optical communication using optical fiber. The optical receptacle is configured such that an end of an optical fiber, held within a cylindrical ferrule, is inserted with the ferrule into the optical receptacle and fixed. In addition, an optical element, such as a semiconductor laser, can be attached to the optical receptacle. The optical receptacle, onto which the optical element and the optical fiber are mounted in this way, optically couples the optical element and the optical fiber.

As an example of an optical receptacle such as this, an optical receptacle is used that includes a lens and a fiber stub on an optical path between the optical fiber and the optical element. The optical receptacle allows light emitted from the optical element to pass through the lens or the fiber stub and couples the light onto the end face of the optical fiber.

An optical module including an optical receptacle of this type is required to have good wiggle characteristics.

Here, wiggle characteristics refer to load characteristics of optical coupling efficiency, indicating changes in the optical coupling efficiency of the optical element and the optical fiber depending on load, when, in a state in which the end of the optical fiber is inserted with the ferrule into the optical receptacle and the optical element is attached to the optical receptacle, load is applied to the ferrule in a direction perpendicular to an optical axis of the end of the optical fiber.

Good wiggle characteristics indicate that deterioration of optical coupling efficiency is low, regardless of increase in load.

In addition to the optical module being required to have good wiggle characteristics, an optimal configuration is required of the optical receptacle itself to achieve good wiggle characteristics.

Here, it is known that the wiggle characteristics improve as the rigidity of the optical receptacle increases. A conventional configuration using an optical receptacle made of metal having high rigidity is suitable in terms of achieving good wiggle characteristics.

However, the metal optical receptacle has a disadvantage of being unsuited for mass production due to high material cost.

Therefore, since the past, there has been a demand for achieving an optical receptacle that can actualize good wiggle characteristics at a low cost. To meet such demands, various proposals have been made.

For example, the optical receptacle is formed using an inexpensive resin material. Rigidity of the optical receptacle is increased in part by a separate sleeve made of a material with high rigidity (such as zirconia) being inserted into a section of the optical receptacle in which the ferrule is inserted, and the sleeve being fixed by adhesion.

Patent Literature 1: Japanese Patent Laid-open Publication No. 2006-184338

However, because the sleeve is conventionally fixed to the optical receptacle by adhesion, problems occur in that the adhesion procedure is costly, and manufacturing efficiency is poor.

SUMMARY OF THE INVENTION

Therefore, the present invention has been achieved in light of the above-described issues. An object of the present invention is to provide an optical receptacle and a manufacturing method thereof that can actualize good wiggle characteristics at a low cost, and improve manufacturing efficiency.

In order to achieve the aforementioned object, an optical receptacle according to a first aspect of the present invention includes a cylindrical sleeve into which a ferrule holding an end section of an optical fiber is inserted. The optical receptacle also includes an optical receptacle main body in which a cylindrical sleeve holding section is formed. The sleeve holding section holds the sleeve by an outer circumferential surface of the sleeve. The sleeve is formed using a material having higher elasticity than that of the optical receptacle main body. The sleeve is held within the sleeve holding section by being press-fitted.

In the invention according to the first aspect, because the sleeve is held within the sleeve holding section by being press-fitted, rigidity can be improved without requiring adhesion. Therefore, good wiggle characteristics can be actualized at a low cost, and manufacturing efficiency can be improved.

The optical receptacle according to a second aspect is the optical receptacle according to the first aspect in which a sum of a press-fitted sleeve thickness and a press-fitted holding section thickness meets a predetermined standard dimension. The press-fitted sleeve thickness is a dimension in a radial direction from an inner circumferential surface of the sleeve to the outer circumferential surface of the sleeve in a sleeve press-fitted state in which the sleeve is press-fitted into the sleeve holding section. The press-fitted holding section thickness is a dimension in the radial direction from an inner circumferential surface of the sleeve holding section to an outer circumferential surface of the sleeve holding section in the sleeve press-fitted state. A sleeve press-fitting dimension is defined as a difference between a dimension in the radial direction from a center of the sleeve to the outer circumferential surface of the sleeve in a sleeve non-fitted state in which the sleeve is not press-fitted into the sleeve holding section and a dimension in the radial direction from a center of the sleeve holding section to the inner circumferential surface of the sleeve holding section in the sleeve non-fitted state. The sleeve press-fitting dimension is set as follows. A first sample of the optical receptacle main body and a second sample of the optical receptacle main body are supposed as two samples. The first sample has a press-fitted holding section thickness that is a predetermined maximum allowable value set based on the standard dimension and in view of manufacturability of the sleeve. The second sample has a press-fitted holding section thickness that is a predetermined minimum allowable value set based on the standard dimension and in view of manufacturability of the sleeve holding section. A correlation between an amount of change in a sleeve inner dimension and the sleeve press-fitting dimension is analyzed for each of the two samples. The amount of change in the sleeve inner dimension is an amount of change in a dimension in the radial direction from the center of the sleeve to the inner circumferential surface of the sleeve in the sleeve press-fitted state in relation to a dimension in the radial direction from the center of the sleeve to the inner circumferential surface of the sleeve in the sleeve non-fitted state. An optimal range of the sleeve press-fitting dimension being calculated based on results of the analysis of the two samples and a predetermined maximum allowable value set for the amount of change in the sleeve inner dimension. The optimal range is set such that the press-fitted holding section thickness is the minimum allowable value or more and the maximum allowable value or less, and the amount of change in the sleeve inner dimension is the maximum allowable value or less. The sleeve press-fitting dimension is selected from the calculated optimal range.

In the invention according to the second aspect, the optimal range of the sleeve press-fitting dimension is calculated based on the results of the analysis of the amount of change in the sleeve inner dimension of the first and second samples of the optical receptacle main body and the maximum allowable value of the amount of change in the sleeve inner dimension. A suitable sleeve press-fitting dimension can be selected from the calculated optimal range. Therefore, rigidity can be improved. In addition, manufacturability of the sleeve holding section and the sleeve can be ensured while meeting prescribed standards. The sleeve can be stably held within the sleeve holding section.

The optical receptacle according to a third aspect is the optical receptacle according to the first aspect, in which the optical receptacle main body is made of a resin material, and the sleeve is made of a ceramic material.

In the invention according to the third aspect, the optical receptacle main body can be efficiently formed at a low cost, and rigidity can be improved with certainty by the sleeve.

The optical receptacle according to a fourth aspect is the optical receptacle according to any one of the first to third aspects, in which the optical receptacle main body includes a lens on an optical path of light transmitted by the optical fiber.

In the invention according to the fourth aspect, an optical element and the optical fiber can be optically coupled in a stable manner, via the lens.

A method of manufacturing an optical receptacle according to a fifth aspect of the present invention is a method of manufacturing an optical receptacle that includes a cylindrical sleeve into which a ferrule holding an end section of an optical fiber is inserted. The optical receptacle also includes an optical receptacle main body in which a cylindrical sleeve holding section is formed. The sleeve holding section holds the sleeve by an outer circumferential surface of the sleeve. In the manufacturing method, the sleeve is formed using a material having higher elasticity than that of the optical receptacle main body. The sleeve is held within the sleeve holding section by being press-fitted.

In the invention according to the fifth aspect, because the sleeve is held within the sleeve holding section by being press-fitted, rigidity of the optical receptacle can be improved without requiring adhesion. Therefore, good wiggle characteristics can be actualized at a low cost, and manufacturability of the optical receptacle can be improved.

The method of manufacturing an optical receptacle according to a sixth aspect is the method of manufacturing an optical receptacle according to the fifth aspect in which a sum of a press-fitted sleeve thickness and a press-fitted holding section thickness meets a predetermined standard dimension. The press-fitted sleeve thickness is a dimension in a radial direction from an inner circumferential surface of the sleeve to the outer circumferential surface of the sleeve in a sleeve press-fitted state in which the sleeve is press-fitted into the sleeve holding section. The press-fitted holding section thickness is a dimension in the radial direction from an inner circumferential surface of the sleeve holding section to an outer circumferential surface of the sleeve holding section in the sleeve press-fitted state. A sleeve press-fitting dimension is defined as a difference between a dimension in the radial direction from a center of the sleeve to the outer circumferential surface of the sleeve in a sleeve non-fitted state in which the sleeve is not press-fitted into the sleeve holding section and a dimension in the radial direction from a center of the sleeve holding section to the inner circumferential surface of the sleeve holding section in the sleeve non-fitted state. The sleeve press-fitting dimension is set as follows. A first sample of the optical receptacle main body and a second sample of the optical receptacle main body are supposed as two samples. The first sample has a press-fitted holding section thickness that is a predetermined maximum allowable value set based on the standard dimension and in view of manufacturability of the sleeve. The second sample has a press-fitted holding section thickness that is a predetermined minimum allowable value set based on the standard dimension and in view of manufacturability of the sleeve holding section. A correlation between an amount of change in a sleeve inner dimension and the sleeve press-fitting dimension is analyzed for each of the two samples. The amount of change in the sleeve inner dimension is an amount of change in a dimension in the radial direction from the center of the sleeve to the inner circumferential surface of the sleeve in the sleeve press-fitted state in relation to a dimension in the radial direction from the center of the sleeve to the inner circumferential surface of the sleeve in the sleeve non-fitted state. An optimal range of the sleeve press-fitting dimension being calculated based on results of the analysis of the two samples and a predetermined maximum allowable value set for the amount of change in the sleeve inner dimension. The optimal range is set such that the press-fitted holding section thickness is the minimum allowable value or more and the maximum allowable value or less, and the amount of change in the sleeve inner dimension is the maximum allowable value or less. The sleeve press-fitting dimension is selected from the calculated optimal range.

In the invention according to the sixth aspect, the optimal range of the sleeve press-fitting dimension is calculated based on the results of the analysis of the amount of change in the sleeve inner dimension of the first and second samples of the optical receptacle main body and the maximum allowable value of the amount of change in the sleeve inner dimension. A suitable sleeve press-fitting dimension can be selected from the calculated optimal range. Therefore, rigidity of the optical receptacle can be improved. In addition, manufacturability of the sleeve holding section and the sleeve can be ensured while meeting standards prescribed for the optical receptacle. The sleeve can be stably held within the sleeve holding section.

The method of manufacturing an optical receptacle according to a seventh aspect is the method of manufacturing an optical receptacle according to the fifth aspect, in which the optical receptacle main body is made of a resin material, and the sleeve is made of a ceramic material.

In the invention according to the seventh aspect, the optical receptacle main body can be efficiently formed at a low cost, and rigidity of the optical receptacle can be improved with certainty by the sleeve.

The method of manufacturing an optical receptacle according to an eighth aspect is the method of manufacturing an optical receptacle according to any one of the fifth to seventh aspects, in which, when the optical receptacle main body is formed, a lens is formed on an optical path of light transmitted by the optical fiber.

In the invention according to the eighth aspect, an optical element and the optical fiber can be optically coupled in a stable manner, via the lens.

In the optical receptacle and the manufacturing method of the present invention, good wiggle characteristics can be actualized at a low cost, and manufacturing efficiency can be improved.

DETAILED DESCRIPTION OF THE PREFERRED EMBODIMENT

An embodiment of an optical receptacle and a manufacturing method of the present invention will be described with reference to FIG. 1 to FIG. 6.

Figure 1:
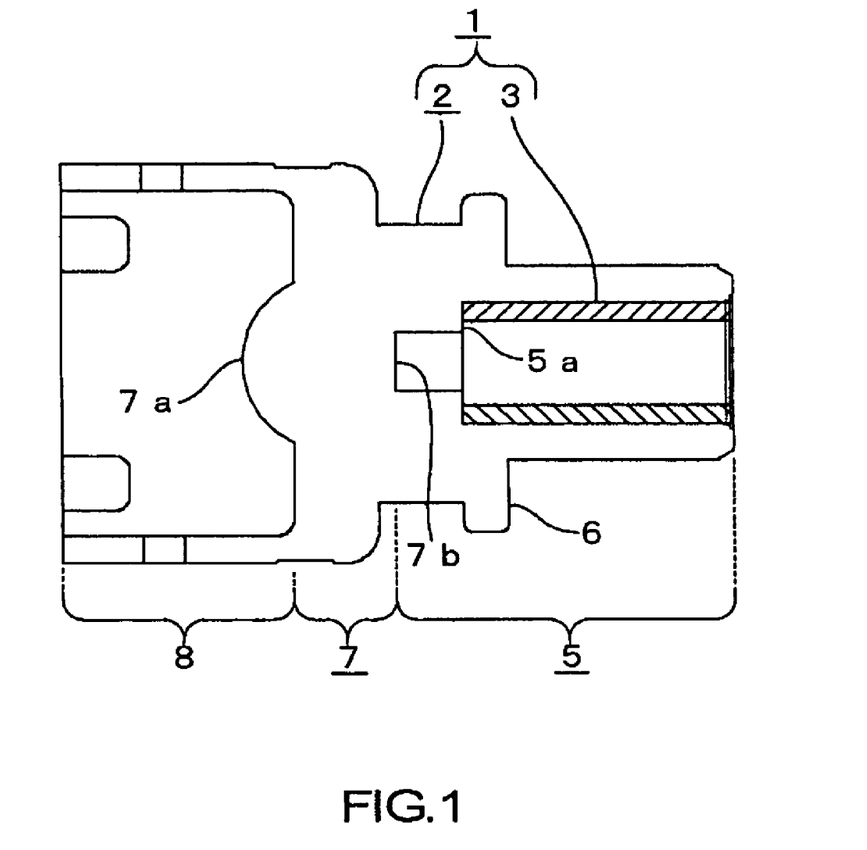
FIG. 1 is a schematic diagram of an optical receptacle according to an embodiment of the present invention.

FIG. 1 is a diagram of an optical receptacle 1 according to the embodiment of the present invention. As shown in FIG. 1, the optical receptacle 1 according to the embodiment largely includes an optical receptacle main body 2 and a cylindrical sleeve 3.

The optical receptacle main body 2 is integrally formed by, for example, injection molding using a resin material (such as polyetherimide) and the like. The optical receptacle main body 2 includes a cylindrical sleeve holding section 5 on a right-end section side in FIG. 1.

A ring-shaped flange section 6 is provided around the sleeve holding section 5 in the vicinity of the left-end section side in FIG. 1. The outer radius of the flange section 6 is greater than the sleeve holding section 5.

An area of the sleeve holding section 5 within a predetermined range on the left-end section side in FIG. 1 is formed having a smaller inner radius than other areas of the sleeve holding section 5. A contact face 5a with which a ferrule 11, described hereafter, comes into contact is formed on a right-end face of the sleeve holding section 5 in the area having the smaller inner radius.

A thick disk-shaped lens section 7 is provided connected to the left end of the sleeve holding section 5. The lens section 7 is formed having a radius that is greater than the outer radius of the sleeve holding section 5 and smaller than the outer radius of the flange section 6. A right-end face of the lens section 7 in FIG. 1 is formed into a flat optical face 7b, and a left-end face in FIG. 1 is formed into an optical face 7a that is convex towards the left side.

A cylindrical optical element attaching section 8 is provided connected to an outer peripheral edge of the lens section 7 on the left-end section in FIG. 1, surrounding the optical face 7a. The inner radius of the optical element attaching section 8 is greater than the radius of the lens section 7. An optical element can be attached to the left-end face side of the optical element attaching section 8 by an attachment method such as adhesion. The optical element can be a so-called CAN-package type or a substrate-mounted type (surface-mounted type).

The sleeve 3, made of a material having higher elasticity than that of the optical receptacle main body 2, is press-fitted into the sleeve holding section 5 of the optical receptacle main body 2, such as that described above, and the sleeve 3 is held therein. As a result, the sleeve holding section 5 holds the sleeve 3 by the outer circumferential surface of the sleeve 3.

Moreover, according to the embodiment, the sleeve 3 is made of a material, such as a ceramic material (for example, zirconia), having higher elasticity than that of the optical receptacle main body 2.

Therefore, according to the embodiment, as a result of the sleeve 3 being press-fitted into the sleeve holding section 5 and held therein, rigidity of the optical receptacle 1 can be improved without requiring adhesion.

Figure 2:
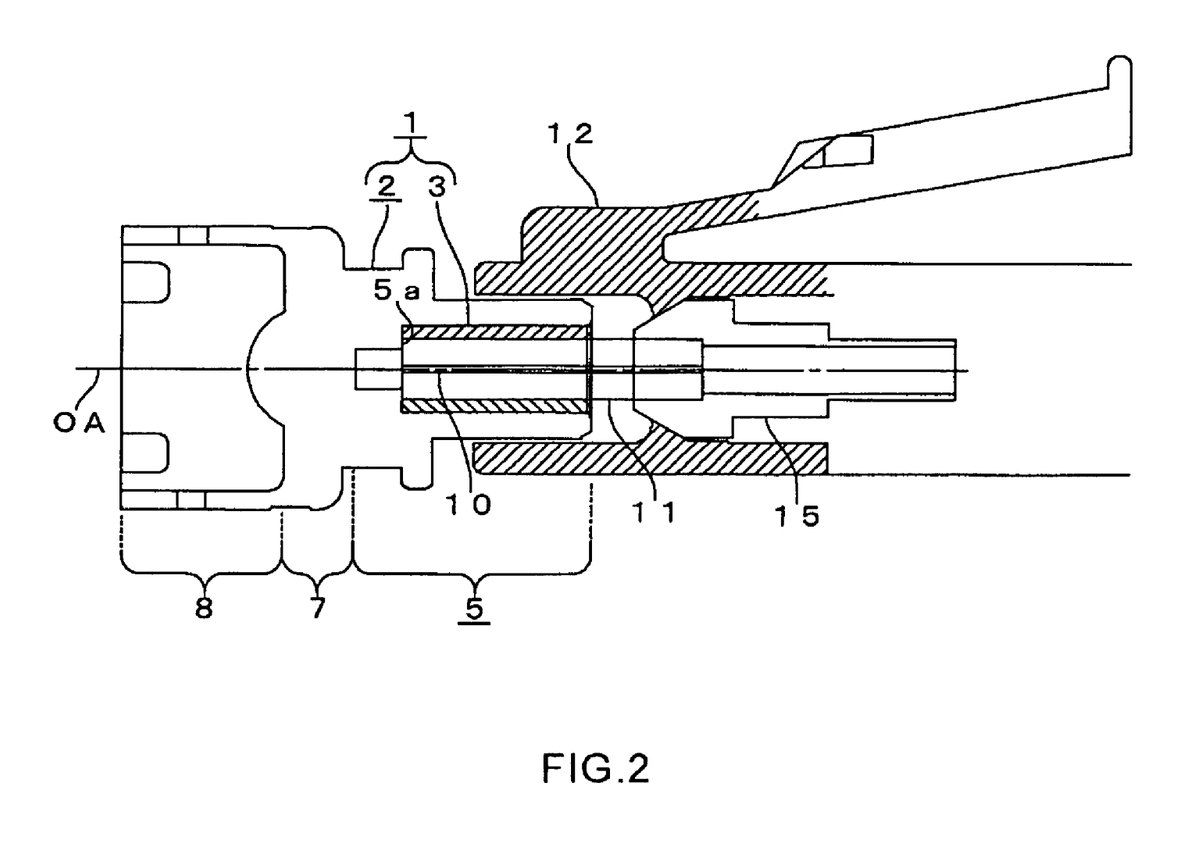
FIG. 2 is a schematic diagram of a state in which an optical fiber is attached to a sleeve holding section 5 in the optical receptacle according to the embodiment of the present invention.

As shown in FIG. 2, in an optical receptacle 1 such as this, the ferrule 11 holding an end section of an optical fiber 10 is inserted into the sleeve 3. In a state in which the ferrule 11 is inserted into the sleeve 3, the left-end face of the ferrule 11 in FIG. 2 comes into contact with the contact face 5a.

An outer periphery of an area of the ferrule 11 within a predetermined range on the right-end section side in FIG. 2 is held by a cylindrical metal holding component 15. The metal holding component 15 is held within an LC connector 12.

An area of the LC connector 12 within a predetermined range on the left-end section side in FIG. 2 is fitted onto the sleeve holding section 5 such as to allow movement. The LC connector 12 can be fixed to the optical receptacle 1 by a fixing means (not shown).

In a state in which the end section of the optical fiber 10 is attached with the ferrule 11 to the optical receptacle 1 in this way, an optical axis of the lens section 7, a center axis of the sleeve holding section 5, a center axis of the optical element attaching section 8, and an optical axis OA of the end section of the optical fiber 10 are disposed in parallel (more preferably, coaxial) with one another.

In addition to the above-described configuration, a sleeve press-fitting dimension of the optical receptacle 1 according to the embodiment is set to an optimal value.

Here, the sleeve press-fitting dimension refers to a difference between a dimension in a radial direction from the center of the sleeve 3 to the outer circumferential surface of the sleeve 3 in a sleeve non-fitted state in which the sleeve is not press-fitted into the sleeve holding section 5 and a dimension in the radial direction from the center of the sleeve holding section 5 to the inner circumferential surface of the sleeve holding section 5 in the sleeve non-fitted state.

The radial direction refers to a direction perpendicular to the optical axis OA of the end section of the optical fiber 10 in a state in which the end section of the optical fiber 10 is attached to the optical receptacle 1 (see FIG. 2) (the same applies hereafter).

When a cylindrical sleeve 3 such as that according to the embodiment is used, the sleeve press-fitting dimension can be considered the difference between the outer radius of the sleeve 3 in the sleeve non-fitted state and the inner radius of the sleeve holding section 5 in the sleeve non-fitted state.

When a sleeve press-fitting dimension such as this is designed according to the embodiment, an optimal sleeve press-fitting dimension is designed sufficiently taking into consideration dimensional standards currently applied to the optical receptacle 1, and tolerance allowed to the sleeve 3.

In other words, restrictions are placed on the optical receptacle 1 such that a sum (referred to, hereinafter, as receptacle thickness) of a press-fitted sleeve thickness and a press-fitted holding section thickness meets a predetermined standard dimension. The press-fitted sleeve thickness is a dimension in the radial direction from the inner circumferential surface of the sleeve 3 to the outer circumferential surface of the sleeve 3 in a sleeve press-fitted state in which the sleeve 3 is press-fitted into the sleeve holding section 5. The press-fitted holding section thickness is a dimension in the radial direction from the inner circumferential surface of the sleeve holding section 5 to the outer circumferential surface of the sleeve holding section 5 in the sleeve press-fitted state.

The standard dimension of the receptacle thickness is a dimension within a fixed range.

Based on dimensional standards such as this, when the press-fitted sleeve thickness is too thick, the press-fitted holding section thickness is required to be made excessively thin. Strength and manufacturability (ease of manufacturing, and the like) of the sleeve holding section 5 become difficult to ensure. On the other hand, when the press-fitted holding section thickness is too thick, the press-fitted sleeve thickness is required to be made excessively thin. Strength and manufacturability (ease of manufacturing, and the like) of the sleeve 3 become difficult to ensure. Therefore, when the sleeve press-fitting dimension is being set, a balance between the press-fitted sleeve thickness and the press-fitted holding section thickness is required to be sufficiently considered.

An inner diameter tolerance allowed to the sleeve 3 to ensure optical coupling efficiency and the like is prescribed. When the sleeve press-fitting dimension is set, it is important that the sleeve press-fitting dimension is designed so as not to deviate from an inner diameter tolerance as that above.

Therefore, according to the embodiment, when the sleeve press-fitting dimension is set during designing, first, two samples, a first sample and a second sample, are supposed as samples of the optical receptacle main body 2.

Here, in the first sample, the press-fitted holding section thickness is a predetermined maximum allowable value set based on the standard dimension of the receptacle thickness and in view of manufacturability of the sleeve 3.

In the second sample, the press-fitted holding section thickness is a predetermined minimum allowable value set based on the standard dimension of the receptacle thickness and in view of manufacturability of the sleeve holding section 5.

The maximum allowable value and the minimum allowable value of the press-fitted holding section thickness can be set to suitable values accordingly by, for example, an evaluation test being conducted, such as a simulation for studying a relationship between the press-fitted holding section thickness and the strength of the sleeve 3, and a simulation for studying a relationship between the press-fitted sleeve thickness and the strength of the sleeve holding section 5.

Next, according to the embodiment, a correlation between an amount of change in a sleeve inner dimension and the sleeve press-fitting dimension is analyzed for each of the first and second samples supposed as described above.

The amount of change in the sleeve inner dimension refers to an amount of change (difference) in a dimension in the radial direction from the center of the sleeve 3 to the inner circumferential surface of the sleeve 3 in the sleeve press-fitted state in relation to a dimension in the radial direction from the center of the sleeve 3 to the inner circumferential surface of the sleeve 3 in the sleeve non-fitted state (same applies hereafter).

When a cylindrical sleeve 3 such as that according to the embodiment is used, the amount of change in the sleeve inner dimension can be considered a difference between the inner radius of the sleeve 3 in the sleeve non-fitted state and the inner radius of the sleeve 3 in the sleeve press-fitted state.

Next, according to the embodiment, the optimal range of the sleeve press-fitting dimension is calculated such that the press-fitted holding section thickness is the minimum allowable value or more and the maximum allowable value or less, and the amount of change in the sleeve inner dimension is a maximum allowable value or less, based on the analysis results of the first and second samples, and a predetermined maximum allowable value set for the amount of change in the sleeve inner dimension.

The maximum allowable value of the amount of change in the sleeve inner dimensions is set based on the inner diameter tolerance allowed to the sleeve 3, and reflects the inner diameter tolerance.

According to the embodiment, a sleeve press-fitting dimension of a desired value is selected based on concept from the calculated optimal range of the sleeve press-fitting dimension. The selected sleeve press-fitting dimension value is set as the sleeve press-fitting dimension used to manufacture the optical receptacle 1.

Therefore, according to the embodiment, the standard prescribed to the optical receptacle 1 can be met, and manufacturability of the sleeve holding section 5 and the sleeve 3 can be ensured. The sleeve 3 can be stably held within the sleeve holding section 5.

EXAMPLES

A Detailed Method of Setting the Sleeve Press-Fitting Dimension

Next, as an example of the present invention, a detailed method of setting the sleeve press-fitting dimension will be described.

Figure 3:
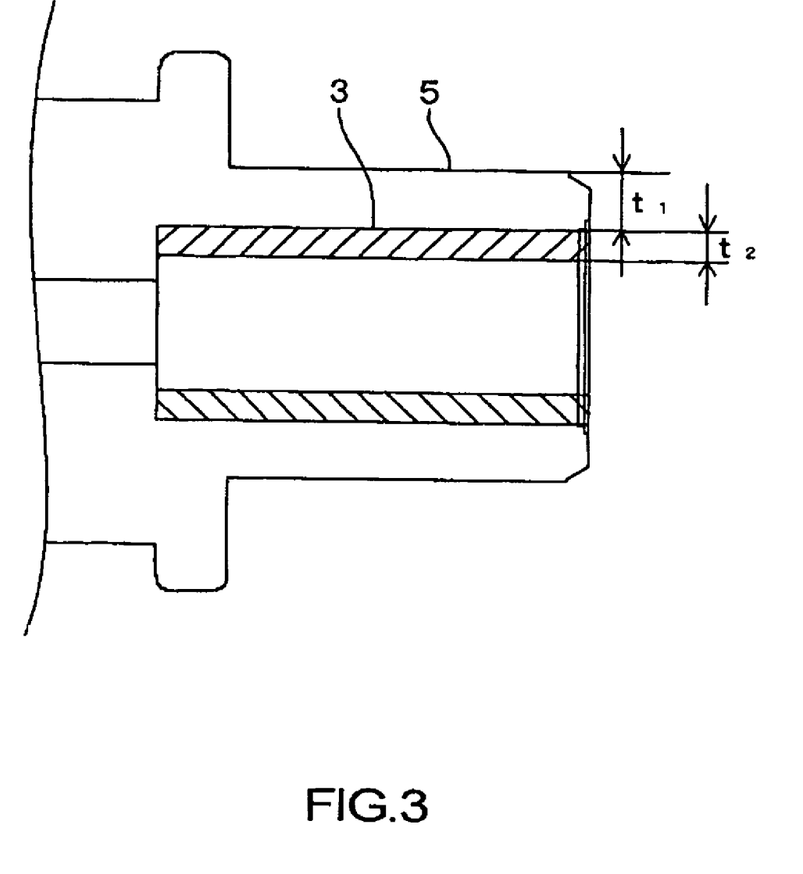
FIG. 3 is a diagram explaining press-fitted sleeve thickness and press-fitted holding section thickness in a manufacturing method of the optical receptacle according to the embodiment of the present invention.

In the example, a first sample having a press-fitted holding section thickness, indicated by $t_1$ in FIG. 3, that is the maximum allowable value of 0.60 mm, and a second sample having a press-fitted holding section thickness $t_1$ that is the minimum allowable value of 0.36 mm are supposed as the first and second samples (analysis models) used to analyze the correlation between the amount of change in the sleeve inner dimension and the sleeve press-fitting dimension described above.

Here, in the example, it is presumed that the standard dimension of the receptacle thickness $t_1+t_2$ that is a sum of the press-fitted holding section thickness $t_1$ and the press-fitted sleeve thickness, indicated by $t_2$ in FIG. 3, is within at least a range of 0.836 mm or more and 0.849 mm or less. In the example, when the press-fitted holding section thickness $t_1$ exceeds 0.60 mm, it is presumed that an analysis result is obtained stating that the sleeve 3 is difficult to manufacture and the strength of the sleeve 3 cannot be guaranteed. Moreover, in the example, when the press-fitted holding section thickness $t_1$ is less than 0.36 mm, it is presumed that an analysis result is obtained stating that the sleeve holding section 5 is difficult to manufacture and the strength of the sleeve holding section 5 cannot be guaranteed.

In the example, the first and second samples are supposed as described above under such presumptions.

Figure 4:
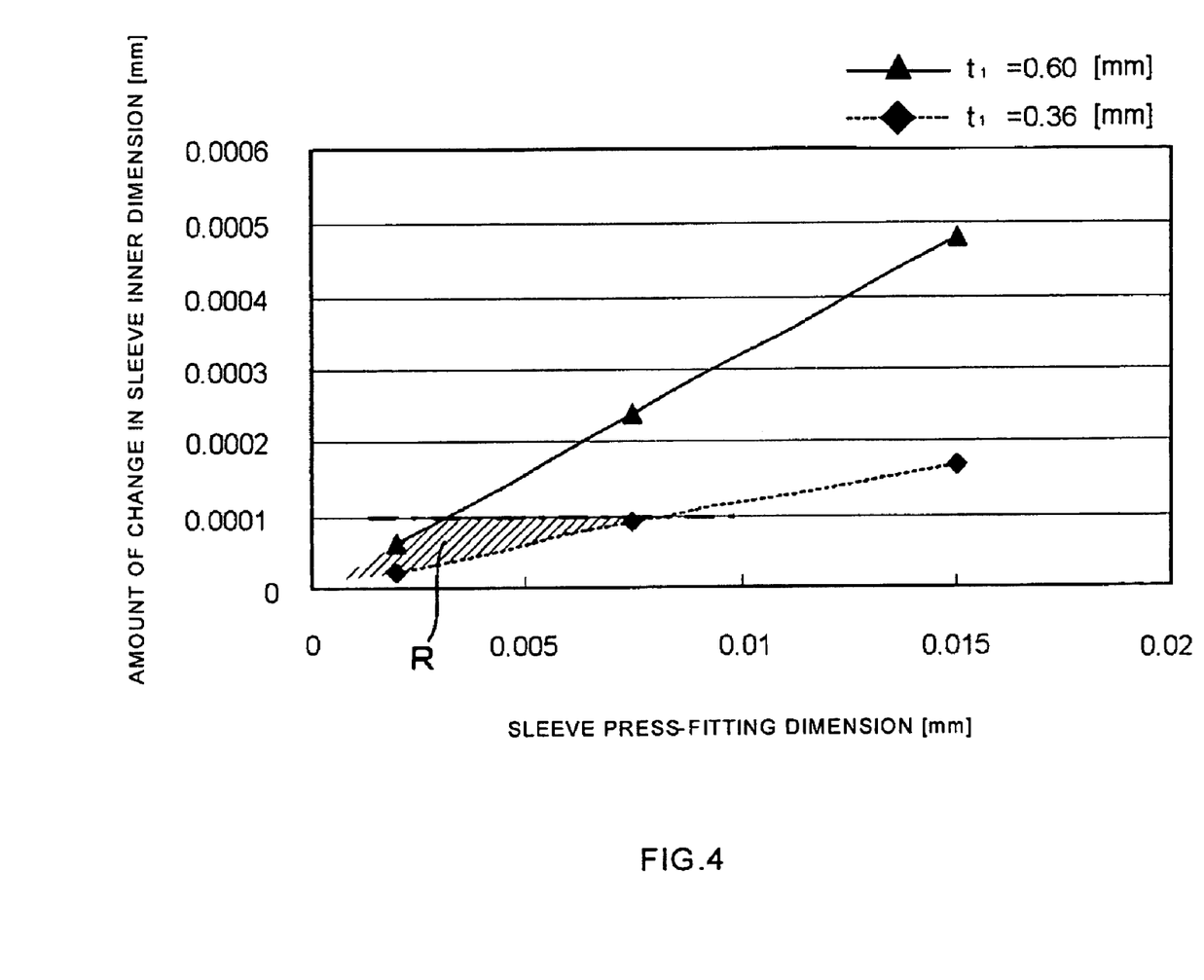
FIG. 4 is a first graph explaining a method of setting a sleeve press-fitting dimension in the manufacturing method of the optical receptacle according to the embodiment of the present invention.

In the example, an analysis result of the correlation such as that indicated by a solid line in the graph in FIG. 4 is obtained for the first sample, by the value of the amount of change in the sleeve inner dimension corresponding to the value of the sleeve press-fitting dimension being calculated and plotted.

In the example, an analysis result of the correlation such as that indicated by a dashed line in the graph in FIG. 4 is obtained for the second sample, by the value of the amount of change in the sleeve inner dimension corresponding to the value of the sleeve press-fitting dimension being calculated and plotted.

Moreover, in the example, the maximum allowable value of the amount of change in the sleeve inner dimension set based on the inner diameter tolerance of the sleeve 3 is added to the analysis result of the correlation, as indicated by a dash-dot line in the graph in FIG. 4. The maximum allowable value of the amount of change in the sleeve inner dimension in FIG. 4 is 0.1 µm, set based on the inner diameter tolerance of the sleeve 3 being ±0.5 µm.

In the example, based on the graph in FIG. 4 created as described above, the optimal range of the sleeve press-fitting dimension is calculated such that the press-fitted holding section thickness $t_1$ is the minimum allowable value (0.36 mm) or more and the maximum allowable value (0.60 mm) or less, and the amount of change in the sleeve inner diameter is the maximum allowable value (0.1 µm) or less.

In FIG. 4, an area surrounded by the above-described solid line, dashed line, and dash-dot line in the graph, namely an area R that is shaded in FIG. 4, is the optimal range of the sleeve press-fitting dimension.

The desired sleeve press-fitting dimension is selected from the optimal range R calculated as described above. The selected sleeve press-fitting dimension is set as the sleeve press-fitting dimension used to manufacture the optical receptacle 1.

Figure 5:
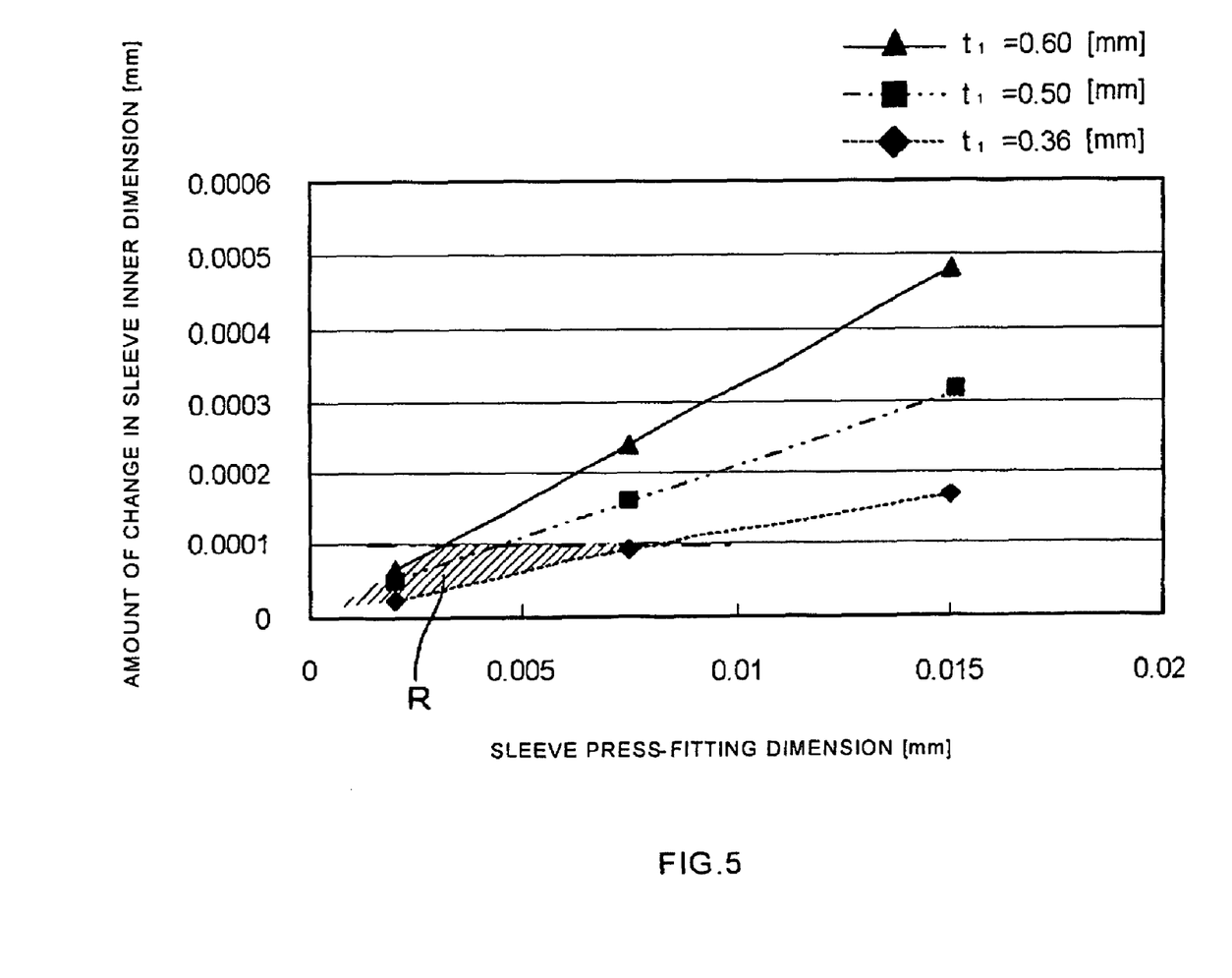
FIG. 5 is a second graph explaining a method of setting the sleeve press-fitting dimension in the manufacturing method of the optical receptacle according to the embodiment of the present invention.

Here, for example, when a design is achieved in which the press-fitted holding section thickness $t_1$ is 0.5 mm, an analysis result of the correlation between the sleeve press-fitting dimension and the amount of change in the sleeve inner dimension when the press-fitted holding section thickness $t_1$ is 0.5 mm in the graph in FIG. 4 is merely required to be displayed, as indicated by a dash-dot-dot line in the graph in FIG. 5. Then, a sleeve press-fitting dimension corresponding to a point within the optimal range R in the displayed graph of the analysis result is selected. The selected sleeve press-fitting dimension is set as the sleeve press-fitting dimension used to manufacture the optical receptacle 1.

An Evaluation of Wiggle Characteristics:

Next, test results will be described regarding a wiggle characteristic test conducted on the optical receptacle 1 of the example manufactured with the sleeve press-fitting dimension set as described above.

In the wiggle characteristic test, the optical receptacle 1 is prepared in which a semiconductor laser serving as an optical element is attached to the optical element attaching section 8, and the ferrule 11 holding the end section of the optical fiber 10 is inserted into the sleeve 3 that is press-fitted into the sleeve holding section 5.

The optical receptacle 1 is positioned in a lateral direction in which a longitudinal direction of the ferrule 11, namely an optical axis direction of the end section of the optical fiber 10, is horizontal.

In a testing system prepared as described above, a load [N] is applied to the ferrule 11 in a downward vertical direction. Load characteristics of the optical coupling efficiency between the semiconductor laser and the optical fiber 10 were studied.

Load characteristics of the optical coupling efficiency in an optical receptacle (conventional optical receptacle) that does not have a sleeve were studied in a manner similar to that of the optical receptacle 1 of the example, as a comparison example for the optical receptacle 1 of the example.

Figure 6:
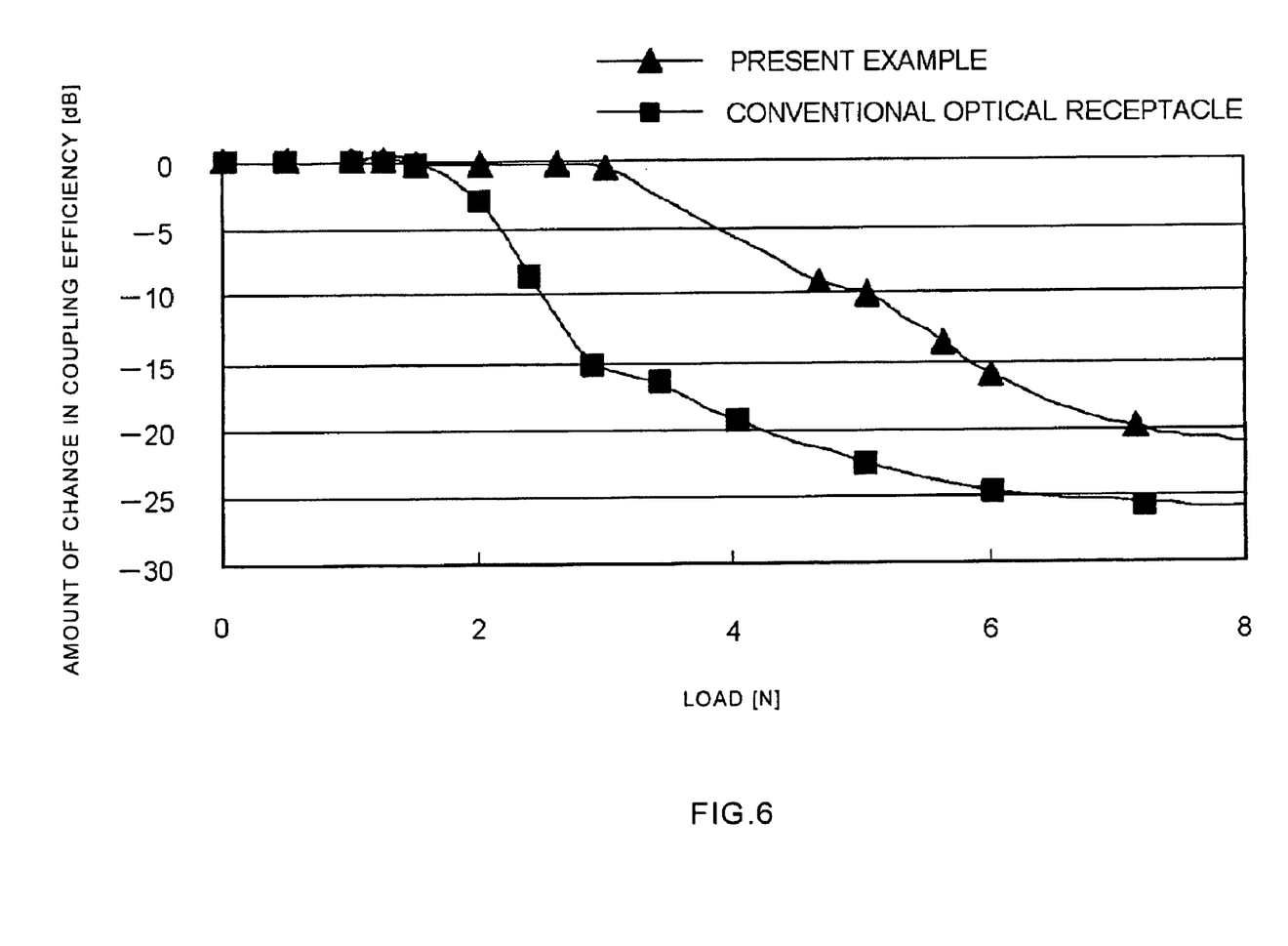
FIG. 6 is a graph showing test results of a wiggle characteristic test conducted on the optical receptacle according to the embodiment of the present invention.

As a result, test results such as those shown in FIG. 6 were obtained.

As shown in FIG. 6, an amount of change in the optical coupling efficiency [dB] in relation to an increase in load is smaller in the optical receptacle 1 of the example, compared to the conventional optical receptacle. It is speculated that the amount of change is smaller because rigidity of the optical receptacle 1 has been improved by the sleeve 3.

An Evaluation of Sleeve Removal Force:

Next, test results will be described regarding a removal force test conducted on the optical receptacle 1 of the example.

In the removal force test, removal force required to remove the sleeve 3 from the sleeve holding section 5 in the optical receptacle 1 having a sleeve press-fitting dimension of 3 µm was studied.

As a result, a sleeve 3 removal force of 16.0N was confirmed for the optical receptacle 1 of the example.

Here, the removal force of when the sleeve 3 is considered stably held is 3.0 N or more. Therefore, the sleeve 3 can be considered to be held by the sleeve holding section 5 with sufficient stability.

As described above, in the present invention, rigidity of the optical receptacle 1 can be improved without requiring adhesion, by the sleeve 3 being press-fitted and held within the sleeve holding section 5. Good wiggle characteristics can be actualized at a low cost, and mass-productivity can be improved.

The present invention is not limited to the above-described embodiment. Various modifications can be made as required.

For example, in the present invention, as long as the sleeve 3 is made of a material having higher elasticity than that of the optical receptacle main body 2, the sleeve 3 can be made of a material other than the above-mentioned ceramic material, and the optical receptacle main body 2 can be made of a material other than the above-mentioned resin material.

The optical receptacle main body 2 according to the above-described embodiment includes the lens section 7. However, the present invention can be applied to an optical receptacle including an optical system other than the lens (such as a fiber stub).

Figure 7:
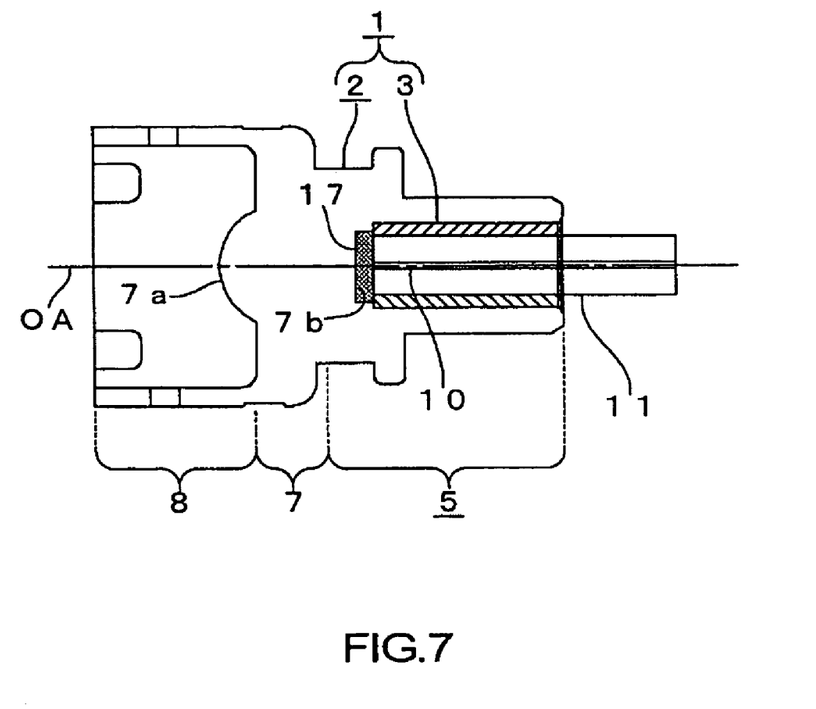
FIG. 7 is a schematic diagram of the optical receptacle of the present invention according to an embodiment differing from that in FIG. 1.

Moreover, as shown in FIG. 7, an anti-reflective optical component 17, such as glass (for example, BK7) or index-matching film, can be disposed within a space sandwiched between the optical face 7b of the lens section 7 and the sleeve 3. For example, FitWell (manufactured by Tomoegawa Co., Ltd.) can be used as the index-matching film.

In FIG. 7, the outer diameter of the anti-reflective optical component 17 disposed between the optical face 7b and the sleeve 3 is greater than the inner diameter of the sleeve 3. Therefore, the anti-reflective optical component 17 can be disposed without requiring adhesion.

In the optical receptacle 1 such as that shown in FIG. 7, when the end section of the optical fiber 10 and the ferrule 11 are inserted into the sleeve 3, the end face of the ferrule 11 comes into contact with the front surface of the anti-reflective optical component 17.

Next, simulation results of the optical coupling efficiency when a wavelength of 1550 nm is used in an optical receptacle 1 in which BK7 (glass) having a refractive index of 1.50 is disposed are shown in Table 1, below. BK7 is an example of the anti-reflective optical component 17, such as that described above. Simulation results of the optical coupling efficiency when a wavelength of 1550 nm is used in an optical receptacle 1 in which the anti-reflective optical component 17 is not disposed are shown in Table 2, below, as a comparison example for Table 1.

Furthermore, simulation results of the optical coupling efficiency when a wavelength of 1310 nm is used in an optical receptacle 1 in which FitWell (index-matching film) having a refractive index of 1.46 is disposed are shown in Table 3, below. FitWell is another example of the anti-reflective optical component 17. Simulation results of the optical coupling efficiency when a wavelength of 1310 nm is used in an optical receptacle 1 in which the anti-reflective optical component 17 is not disposed are shown in Table 4, below, as a comparison example for Table 3.

The simulation results were calculated based on Fresnel reflection.

TABLE 1

|  | Lens Section | Glass | Fiber Core |
|---|---|---|---|
| Refractive Index | 1.627 | 1.500 | 1.468 |
| Reflection Loss between Lens Section and Glass [%] | 0.010 | | |
| Reflection Loss between Glass and Fiber Core [%] | | | 0.012 |
| Coupling Loss between Lens Section and Glass [dB] | 0.000 | | |
| Coupling Loss between Glass and Fiber Core [dB] | | | −0.001 |
| Total Loss [dB] | | −0.001 | |

TABLE 2

|  | Lens Section | Air | Fiber Core |
|---|---|---|---|
| Refractive Index | 1.627 | 1 | 1.468 |
| Reflection Loss between Lens Section and Glass [%] | 3.174 | | |
| Reflection Loss between Glass and Fiber Core [%] | | | 3.596 |
| Coupling Loss between Lens Section and Glass [dB] | −0.140 | | |
| Coupling Loss between Glass and Fiber Core [dB] | | | −0.159 |
| Total Loss [dB] | | −0.299 | |

TABLE 3

|  | Lens Section | FitWell | Fiber Core |
|---|---|---|---|
| Refractive Index | 1.630 | 1.460 | 1.468 |
| Reflection Loss between Lens Section and FitWell [%] | 0.001 | | |
| Reflection Loss between FitWell and Fiber Core [%] | | | 0.001 |
| Coupling Loss between Lens Section and FitWell [dB] | 0.000 | | |
| Coupling Loss between FitWell and Fiber Core [dB] | | | 0.000 |
| Total Loss [dB] | | 0.000 | |

TABLE 4

|  | Lens Section | Air | Fiber Core |
|---|---|---|---|
| Refractive Index | 1.630 | 1 | 1.468 |
| Reflection Loss between Lens Section and Glass [%] | 3.167 | | |
| Reflection Loss between Glass and Fiber Core [%] | | | 3.596 |
| Coupling Loss between Lens Section and Glass [dB] | −0.140 | | |
| Coupling Loss between Glass and Fiber Core [dB] | | | −0.159 |
| Total Loss [dB] | | −0.299 | |

As is clear from the results in Table 1 to Table 4, to improve optical coupling efficiency, the anti-reflective optical component 17 (particularly the index-matching film) is preferably disposed as shown in FIG. 7.

What is claimed is:

1. An optical receptacle comprising:
a cylindrical sleeve into which a ferrule holding an end section of an optical fiber is inserted; and
an optical receptacle main body in which a cylindrical sleeve holding section is formed, the cylindrical sleeve holding section holding the cylindrical sleeve by an outer circumferential surface of the cylindrical sleeve, wherein
the cylindrical sleeve is formed using a material having higher elasticity than that of the optical receptacle main body, and is held within the cylindrical sleeve holding section by being press-fitted; and
a sum of a press-fitted sleeve thickness ($t_2$) and a press-fitted holding section thickness ($t_1$) meets a predetermined standard dimension, the press-fitted sleeve thickness being a dimension in a radial direction from an inner circumferential surface of the cylindrical sleeve to the outer circumferential surface of the cylindrical sleeve in a sleeve press-fitted state in which the cylindrical sleeve is press-fitted into the cylindrical sleeve holding section, and the press-fitted holding section thickness being a dimension in the radial direction from an inner circumferential surface of the cylindrical sleeve holding section to an outer circumferential surface of the cylindrical sleeve holding section in the sleeve press-fitted state, and the predetermined standard dimensions satisfy:

$0.836 \text{ mm} \leq t_1 + t_2 \leq 0.849 \text{ mm}$ wherein $0.36 \text{ mm} < t_1 < 0.60 \text{ mm}$;
$t_1$: press-fitted holding section thickness, and
$t_2$: press-fitted sleeve thickness.

2. The optical receptacle according to claim 1, wherein:
a sleeve press-fitting dimension that is defined as a difference between a dimension in the radial direction from a center of the sleeve to the outer circumferential surface of the sleeve in a sleeve non-fitted state in which the sleeve is not press-fitted into the sleeve holding section and a dimension in the radial direction from a center of the cylindrical sleeve holding section to the inner circumferential surface of the cylindrical sleeve holding section in the sleeve non-fitted state is set by
a first sample of the optical receptacle main body and a second sample of the optical receptacle main body being supposed as two samples, the first sample having a press-fitted holding section thickness that is a predetermined maximum allowable value set based on the standard dimension and in view of manufacturability of the sleeve, and the second sample having a press-fitted holding section thickness that is a predetermined minimum allowable value set based on the standard dimension and in view of manufacturability of the sleeve holding section, a correlation between an amount of change in a sleeve inner dimension and the sleeve press-fitting dimension being analyzed for each of the two samples, tbe amount of change in the sleeve inner dimension being an amount of change in a dimension in the radial direction from the center of the sleeve to the inner circumferential surface of the sleeve in the sleeve press-fitted state in relation to a dimension in the radial direction from the center of the cylindrical sleeve to the inner circumferential surface of the cylindrical sleeve in the sleeve non-fitted state, an optimal range of the sleeve press-fitting dimension being calculated based on results of the analysis of the two samples and a predetermined maximum allowable value set for the amount of change in the cylindrical sleeve inner dimension, the optimal range set such that the press-fitted holding section thickness is the minimum allowable value or more and the maximum allowable value or less, and the amount of change in the sleeve inner dimension is the maximum allowable value or less, and the cylindrical sleeve press-fitting dimension being selected from the calculated optimal range.

3. The optical receptacle according to claim 1, wherein:

the optical receptacle main body is made of a resin material; and the cylindrical sleeve is made of a ceramic material.

4. Th eoptical receptacle according to claim 1, 2 or 3, wherein the optical receptacle main body includes a lens on an optical path of light transmitted by the optical fiber.

* * * * *